(12) United States Patent
Bontu et al.

(10) Patent No.: US 6,272,186 B1
(45) Date of Patent: Aug. 7, 2001

(54) NORMAL BURST ACQUISITION SYSTEM FOR USE IN A CELLULAR COMMUNICATIONS NETWORK

(75) Inventors: Chandra Sekhar Bontu; Abdulbaset Atweri Zurgani, both of Nepean (CA); Yonghai Gu, Redmond, WA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/218,414

(22) Filed: Dec. 22, 1998

(51) Int. Cl.[7] .............. H04L 27/10; H04L 27/14; H04L 7/04; H04L 7/06
(52) U.S. Cl. .............. 375/340; 375/362; 375/365; 375/366
(58) Field of Search .............. 375/365, 329, 375/316, 340, 368, 362, 366

(56) References Cited

U.S. PATENT DOCUMENTS

| | | | |
|---|---|---|---|
| 5,299,189 | * | 3/1994 | Takahashi .............. 370/58.2 |
| 6,167,079 | * | 12/2000 | Kinnunen et al. .............. 375/255 |
| 6,198,779 | * | 3/2001 | Taubenheim et al. .............. 375/316 |

* cited by examiner

*Primary Examiner*—Chi Pham
*Assistant Examiner*—Dung X. Nguyen

(57) ABSTRACT

The invention is a novel method enabling a base station receiver to quickly and accurately validate a coded digital verification color code (CDVCC) vector received from a mobile station against a locally stored CDVCC vector identifying the cell to which it belongs. At the base station receiver, the received signal is sampled at twice the transmitted symbol rate, producing complex-valued samples of the received symbol envelope. These contain the received CDVCC vector and a known SYNC vector, and are assumed to have undergone dispersion characterized by several dispersion coefficients. The SYNC vector is detected with relative ease, allowing the establishment of a reference sample time. This is followed by the receiver determining a plurality of possible starting times (or "shifts") for the CDVCC vector relative to the reference sample time. These shifts preferably cover the time advances or delays that the CDVCC vector may have undergone due to dispersion, relative to the position of the SYNC vector as detected. For each of the possible shifts, the dispersion coefficients are estimated a number of times and a metric is derived, which is a measure of the variation in the estimates of the dispersion coefficients. Since the dispersion coefficients are not expected to change significantly throughout the duration of the CDVCC, a low value for the metric should be reached when the received CDVCC vector matches the locally stored CDVCC vector for at least one of the possible CDVCC vector shifts.

21 Claims, 9 Drawing Sheets

NORMAL BURST ACQUISITION SYSTEM FOR USE IN A CELLULAR COMMUNICATIONS NETWORK

FIELD OF THE INVENTION

The present invention relates to mobile communications systems in general and, in particular, to a method and system for accelerating the acquisition of normal bursts by a base station.

BACKGROUND OF THE INVENTION

In a typical TDMA (time-division multiple-access) cellular communications system, a large geographic region is subdivided into cells and, for each cell, at least one base station is given the responsibility of communicating with mobile stations located within that cell. In the so-called "reverse link" direction of communication, mobile stations transmit data in assigned time slots using assigned carrier frequencies. While adjacent cells always use distinct carrier frequencies, cells which are separated by at least one other cell may use the same carrier frequency.

If a digital modulation technique known as quaternary phase-shift keying (QPSK) is used, then the data to be transmitted by a mobile station is grouped into pairs of bits, each pair identifying one of four possible symbols. The modulated radio-frequency signal transmitted by the mobile station thus has a "transmitted symbol rate" which is one-half the data bit rate; the time interval between two transmitted symbols, known as the "transmitted symbol period", is expressed as $T_s$.

Several mobile stations can share a carrier frequency by virtue of being assigned distinct time slots in which they can transmit their respective modulated radio-frequency signals. The TIA/EIA standard known as IS-54, and incorporated by reference herein, allows a maximum of six mobile stations to share a single carrier frequency by subdividing each recurring 240 millisecond time interval, referred to as a TDMA frame, which is further subdivided into six individually assigned time slots. With reference to FIG. 1A, a time slot 2 in normal burst format in accordance with TIA/EIA standard IS-54 comprises 324 bits and is subdivided into several fields, including a SYNC field 4 (of length 28 bits), three DATA fields 6,8,10 (of length 16, 122 and 122 bits, respectively) and a coded digital verification color code (CDVCC) field 12 (of length 12 bits).

It is noted that when QPSK is employed, the 324 bits are not transmitted individually, but rather are grouped by pairs into 162 symbols for transmission. Thus, when subsequent pairs of bits forming the 28-bit SYNC field 4 are assembled into symbols (phase vectors), the SYNC bit pattern may be represented by a fourteen-element complex-valued SYNC vector. Similarly, by grouping the 12 bits in the CDVCC field 12 into pairs, each pair forming a symbol, the CDVCC bit pattern may be represented by a six-element complex-valued CDVCC vector.

The SYNC field 4 is used for timing and carrier recovery at the base station. Although the SYNC field 4 is required to be distinct for each of up to six time slots multiplexed onto recurring frames transmitted at a given carrier frequency, the same set of six SYNC bit patterns are also associated with the six available time slots corresponding to a different carrier frequency. On the other hand, the CDVCC field 12 is uniquely associated with each cell and is used by a mobile station to identify the cell.

During handoff and other scenarios, it is of paramount importance to ensure that a base station can perform rapid and reliable validation of the CDVCC vector. This is true for any cellular system and in particular for one which is compliant with IS-54. In theory, rapid validation of the CDVCC vector can be achieved by a base station detecting the SYNC vector (which can be chosen to possess strong correlation properties), establishing a relatively accurate clock signal, detecting the CDVCC vector and comparing it to the CDVCC vector uniquely identifying the base station.

However, multipath or other dispersive effects of the radio-frequency channel may cause the SYNC vector to be detected with some delay. For instance, FIG. 1B illustrates the correlation function of a detected SYNC vector with the known SYNC vector under ideal conditions (top) and under multipath conditions (bottom). Specifically, the detected SYNC vector may be found to have a high correlation with the known SYNC vector when the detected SYNC vector is delayed from its true position by up to one full transmitted symbol period $T_s$ (or more, in some cases). If multipath effects vanish by the time the CDVCC vector is expected to be received, i.e., after the expiry of 67 transmitted symbol periods as shown in FIG. 1A, then the true position of the CDVCC vector may in fact precede, by up to $T_s$ seconds, the position at which it is thought to be, based on the position of the detected SYNC vector.

To solve this problem, it might appear plausible to attempt detection and verification of the CDVCC vector using an correlation-based method similar to that employed for detection of the SYNC vector. However, it is noted that the CDVCC vector is uniquely associated with a given cell and therefore cannot be made to possess good auto-correlative properties for all cells, which renders this rudimentary technique unreliable for validation of the CDVCC vector.

One known approach is for the receiver to detect the SYNC vector and then to adaptively track channel variations for each and every one of the subsequent symbols in order to arrive at a precise estimate of where the CDVCC vector actually begins. However, this method is prohibitively complex, as it requires very fast tracking of the channel using computationally intensive adaptive algorithms. Furthermore, the channel tracking suffers from low accuracy in the presence of demodulated symbol errors.

SUMMARY OF THE INVENTION

It is an object of the present invention to mitigate or obviate one or more disadvantages of the prior art.

Therefore, the invention may be summarized according to a first broad aspect as a method of determining the presence of a verification sequence in a received sample stream arriving at respective sample times and having a received sample rate, said verification sequence consisting of a plurality of samples including a first sample, said received sample stream being obtained from a transmitted symbol stream having a transmitted symbol rate and having undergone dispersion, said dispersion being characterized by a plurality of dispersion coefficients, the method comprising the steps of: determining a reference sample time; for each one of a plurality of sample shifts indicating possible locations for the first sample of the verification sequence relative to the reference sample time: calculating at least two estimates for each of the plurality of dispersion coefficients; calculating the variation among the at least two estimates for each of the plurality of dispersion coefficients; and combining the calculated variations into a combined metric associated with the sample shift; and if the combined metric associated with at least one of the sample shifts is below a predetermined threshold, deciding that the verification sequence is present in the received sample stream.

According to a second broad aspect, the invention maybe summarized as a system for determining the presence of a verification sequence in a received sample stream arriving at respective sample times and having a received sample rate, comprising: means for correlating a synchronization sequence with a current sample and selected past samples of the received sample stream, thereby to produce a correlation factor; means for estimating the power contained in the received sample stream; means for determining a reference sample time from the correlation factor and from the estimated power; means for calculating, for each one of a plurality of sample shifts indicating possible locations for the first sample of the verification sequence relative to the reference sample time, at least two estimates for each of a plurality of dispersion coefficients; means for calculating the variation among the at least two estimates for each of the plurality of dispersion coefficients; means for combining the calculated variations into a combined metric associated with the sample shift; wherein if the combined metric associated with at least one of the sample shifts is below a predetermined threshold, the system deciding that the verification sequence is present in the received sample stream.

The invention may be summarized according to a third broad aspect as a computer-readable storage medium containing software which, when running on a processor, follows a sequence of steps to determine the presence of a verification sequence in a received sample stream arriving at respective sample times and having a received sample rate, said verification sequence consisting of a plurality of samples including a first sample, said received sample stream being obtained from a transmitted symbol stream having a transmitted symbol rate and having undergone dispersion, said dispersion being characterized by a plurality of dispersion coefficients, the steps comprising: determining a reference sample time; for each one of a plurality of sample shifts indicating possible locations for the first sample of the verification sequence relative to the reference sample: calculating at least two estimates for each of the plurality of dispersion coefficients; calculating the variation among the at least two estimates for each of the plurality of dispersion coefficients; and combining the calculated variations into a combined metric associated with the sample shift; and if the combined metric associated with at least one of the sample shifts is below a predetermined threshold, deciding that the verification sequence is present in the received sample stream.

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 1A:
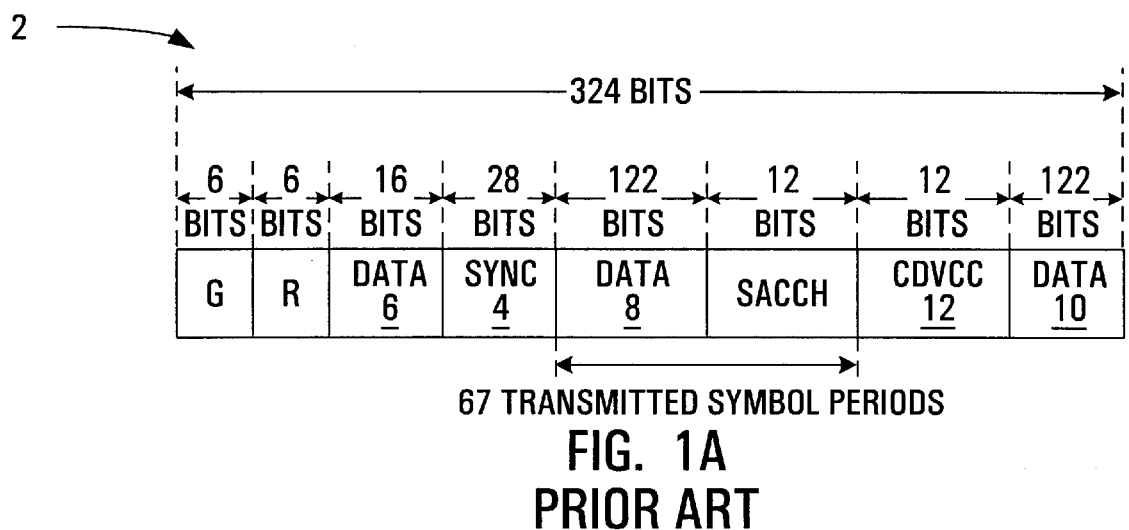
FIG. 1A is a diagram of a "normal burst" in accordance with TIA/EIA standard IS-54.
Figure 1B:
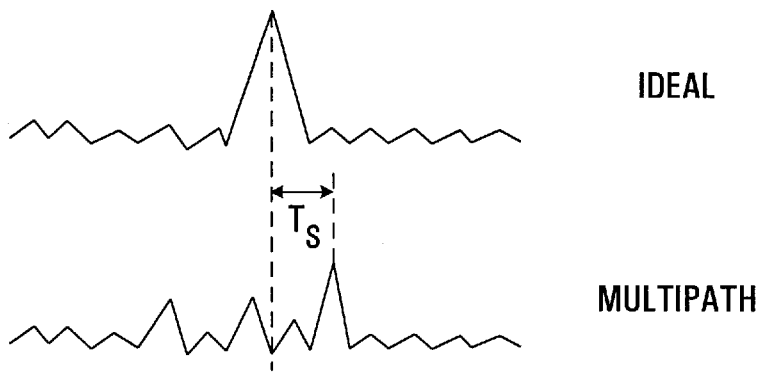
FIG. 1B illustrates the correlation function of a detected SYNC vector with the known SYNC vector under ideal conditions and under multipath conditions.

In the reverse-link direction of communication, it is supposed that a digital signal intended for transmission by a mobile station has a transmitted symbol rate of $1/T_s$, where $T_s$ is the transmitted symbol period. In addition, it is supposed that QPSK is employed, meaning that the transmitted symbols can be regarded as being complex-valued, each complex-valued symbol identifying one of four possible constellation vectors in the complex plane. The digital signal is segmented and formatted into normal bursts comprising the usual SYNC, data and CDVCC fields. In particular, the SYNC field consists of a known complex-valued SYNC vector $s=S_0, \ldots, S_{13}$. On the other hand, the CDVCC field is assumed to identify a particular base station by virtue of a corresponding complex-valued CDVCC vector, say, $c^A=c_0^A, \ldots, c_5^A$.

Still at the mobile station, the normal bursts are converted to analog format, modulated about a high-frequency carrier and finally transmitted by an antenna, becoming a radio-frequency signal. In each recurring 40-millisecond frame, transmission occurs for the duration of two time slots assigned to the mobile station (in the case of a full-rate user). As the radio-frequency signal travels through the air, it is subject to multipath dispersion.

Multipath dispersion causes the spreading of complex-valued symbols into adjacent symbol intervals. Although the present invention is applicable to an arbitrary degree of spreading, it has been assumed for convenience of notation that spillage from one symbol interval significantly affects only the next symbol interval.

Upon arrival at a base station receiver, the (possibly corrupted) radio-frequency signal is received by an antenna and down-converted to a complex baseband signal envelope r(t). As already mentioned, the base station is aware of the SYNC vector s it expects to receive. In addition, the base station has knowledge of a locally stored CDVCC vector $c^B=c^B, \ldots, c_5^B$, which is assigned by the base station during the initial call setup. It will be shown hereinbelow that validation performed in accordance with the present invention allows the determining of whether or not $c_B$ is identical to $c^A$ and, furthermore, how much delay there exists between the last symbol in the detected SYNC vector and the first symbol in the received CDVCC vector.

The baseband signal envelope r(t), which is complex, then enters a normal burst acquisition system generally indicated at 200 in accordance with the present invention, which will now be described with reference to FIG. 2. Structurally, the normal burst acquisition system 200 comprises a sampler 201 having both an input for accepting the baseband signal envelope r(t) and an output connected to a correlator-integrator 202, a power detector 204 and a CDVCC validation block 207.

It is important to consider that the sampler 201 produces a sequence of received, complex-valued samples rk at a sampling frequency of preferably $2/T_s$ hertz, or twice the transmitted symbol rate. This improves accuracy and resolution when dispersion causes an error on the order of half a transmitted symbol period in judging the actual position of a received sample relative to its true position. The subscript k is a time index (or "sample time") beginning at zero at some arbitrary time in the past and auto-incrementing by one at every sample (or ½ transmitted symbol period).

The sequence of samples $r_k$ is fed to the correlator-integrator 202, to the power detector 204 and to the CDVCC validation block 207. In addition to accepting the complex-valued samples $r_k$ from the sampler 201, the correlator-integrator 202 is also connected to a SYNC pattern generator 203, preferably a readable memory element. The correlator-integrator 202 computes a correlation factor R based on the correlation level between the SYNC vector s received from the SYNC pattern generator 203 and certain ones of the complex-valued samples $r_k$, as discussed below in further detail. The correlator-integrator 202 then outputs the value R to a first input of a comparator 206.

Meanwhile, the power detector 204 computes a power estimate P which is indicative of the overall power of selected ones of the most recently received complex-valued samples $r_k$, as will be discussed in further detail hereinbelow. The value P is fed to a multiplier 205, where it is multiplied by a scaling factor $\eta$, $0 \leq \eta \leq 1$, yielding a value $\eta P$ which is fed to a second input of the comparator 206.

Figure 6:
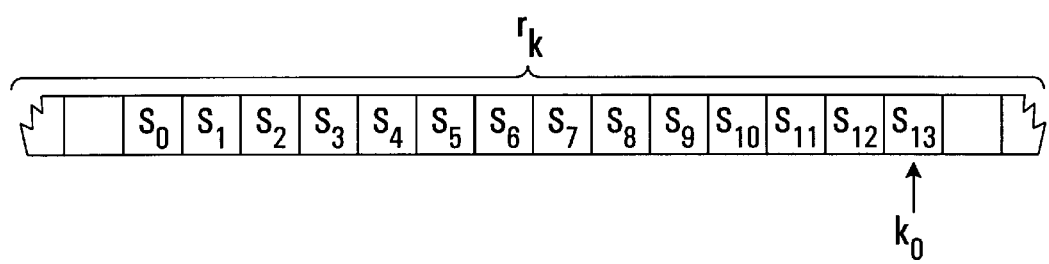
FIG. 6 depicts a stream of received samples and a reference sample time $k_0$ indicating the time at which the known SYNC vector has been detected.

If and when the SYNC vector s is detected (in a manner to be described later on in further detail), the comparator 206 outputs a "sync found" signal 257, consisting of a reference sample time $k_0$ equal to the current time index k. With reference to FIG. 6, the reference sample time $k_0$ is shown as the sample time at which the SYNC vector s has been correctly detected. It is to be noted that determination of the reference sample time $k_0$ (as contained in the "sync found" signal 257) may be influenced by multipath effects and might therefore be delayed by up to one transmitted symbol period relative to the true position of the last element of the SYNC vector.

The CDVCC validation block 207 is responsive to the "sync found" signal 257 and validates the CDVCC, which, in an ideal scenario, occurs after 67 transmitted symbol periods, but which may occur before or after, depending on the severity of the dispersion. Validation of the CDVCC consists of determining whether the received CDVCC vector $c^A$ matches the locally stored CDVCC vector $c^B$ which, as discussed above, is assigned by the base station during the initial call setup. If the received CDVCC vector $c^A$ does indeed match the locally stored CDVCC vector $c^B$, then the CDVCC validation block 207 will send a message to other base station components (not shown) declaring that the mobile belongs to the cell associated with the base station.

Figure 2:
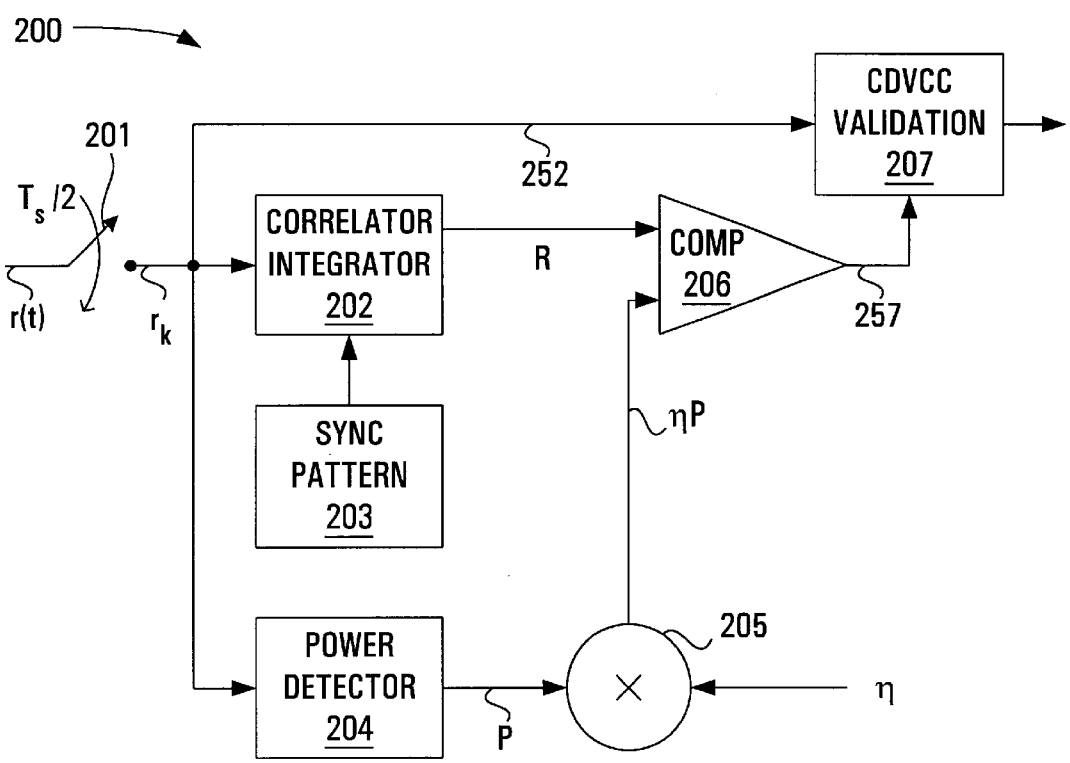
FIG. 2 is a block diagram illustrating a normal burst acquisition system in accordance with the preferred embodiment of the present invention.

With the exception of the sampler 201, all the components of the normal burst acquisition system 200 in FIG. 2 may be implemented in purely digital form, that is to say, on a micro-processor, digital signal processor or computer. Incidentally, while the invention is best suited to the case wherein the sampling frequency of the sampler 201 is twice the transmitted symbol rate, other ratios nevertheless lead to functional embodiments of the invention.

In operation, the principal task of the normal burst acquisition system 200 is to determine whether or not the received CDVCC vector $c^A$ is identical to the locally stored CDVCC vector $c^B$. In accordance with the present invention, this is achieved without ever detecting the individual elements of the received CDVCC vector $c^A$, but rather by relying on the constancy of dispersion coefficients throughout the duration of the CDVCC vector, as described hereinbelow.

Figure 3:
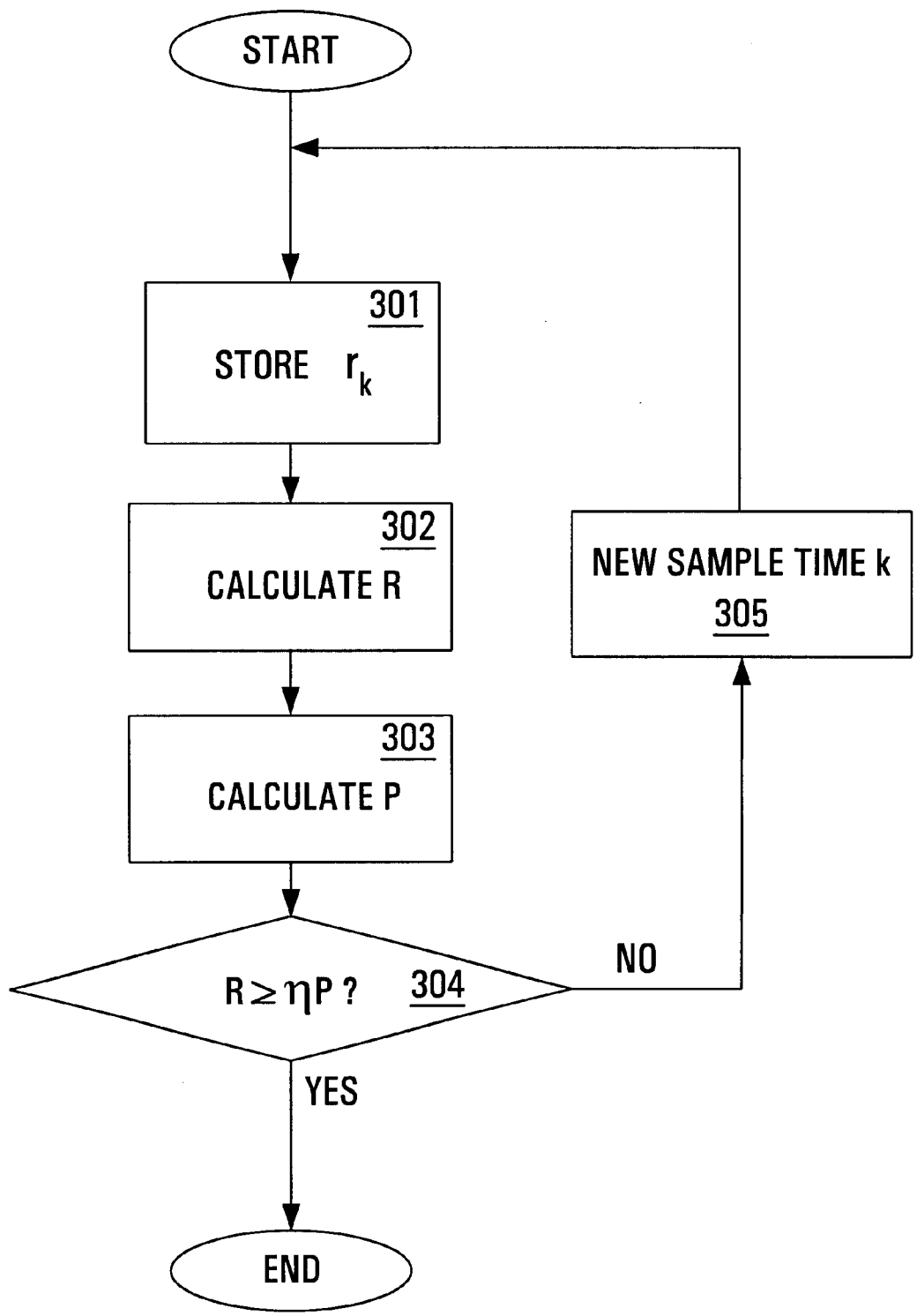
FIG. 3 is a flowchart illustrating a SYNC detection algorithm performed by the system of FIG. 2.
Figure 4A:
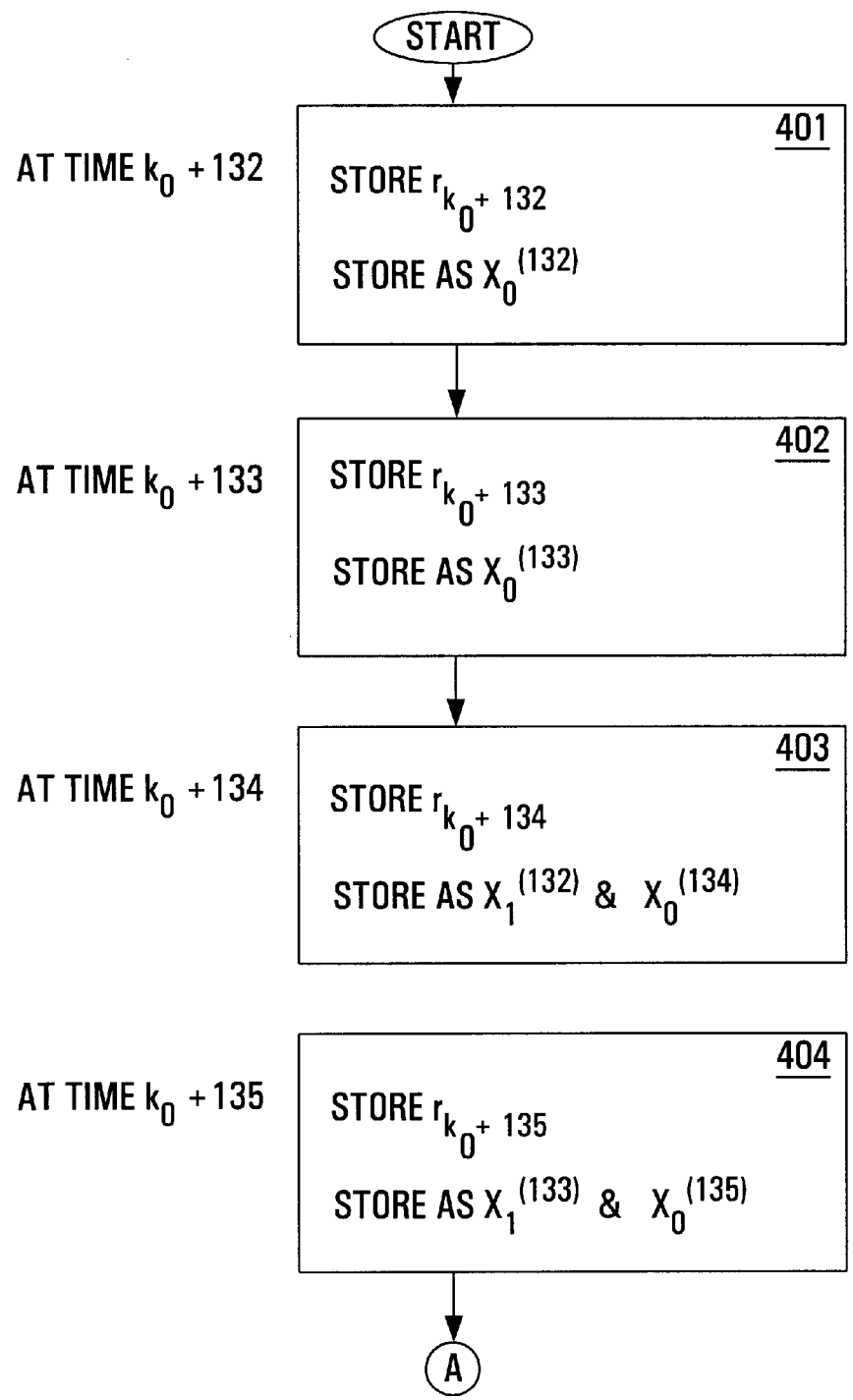
FIGS. 4A–4D illustrate, by way of a flowchart, a CDVCC validation algorithm performed by the system of FIG. 2.
Figure 4B:
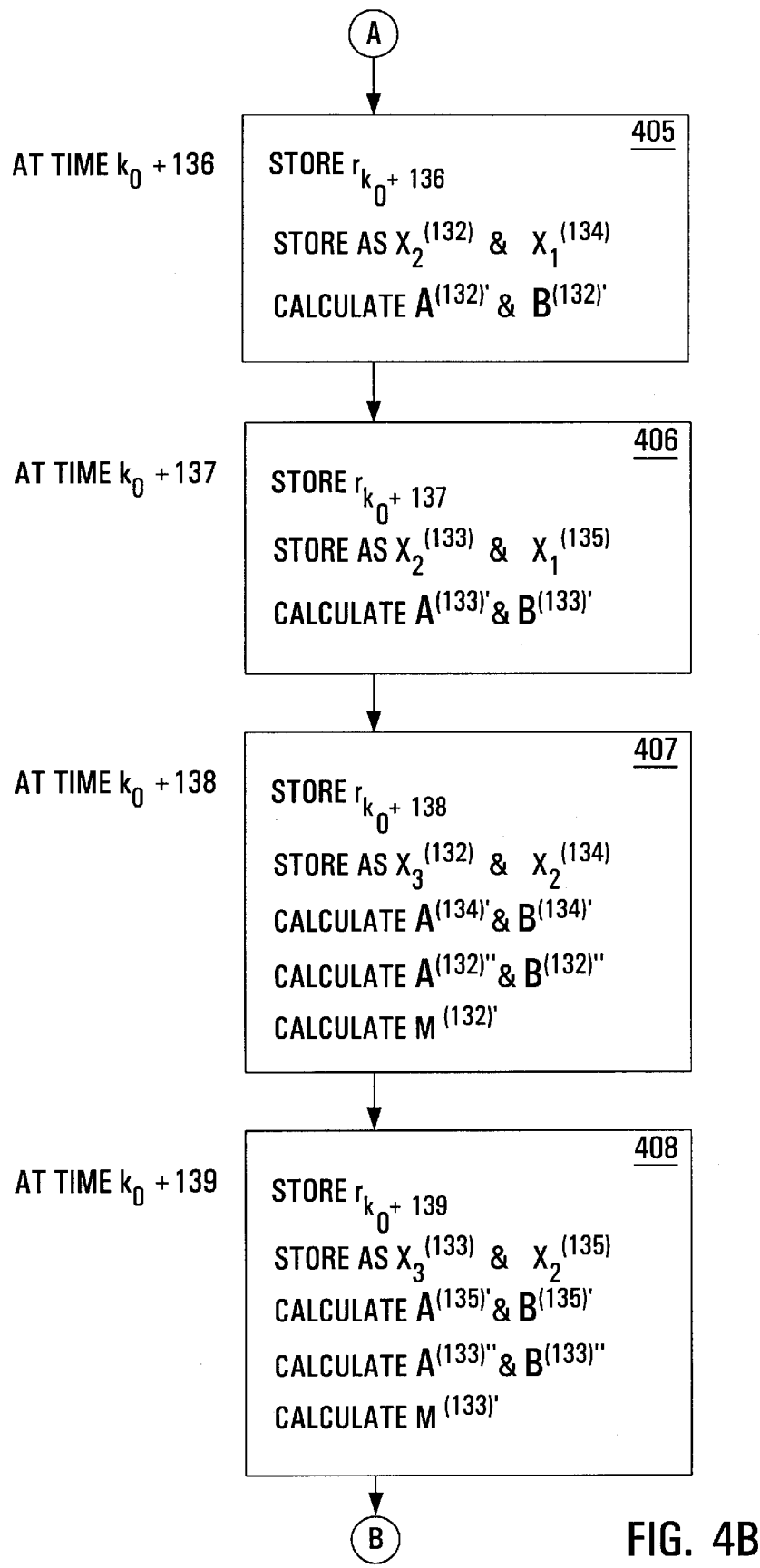
Figure 4C:
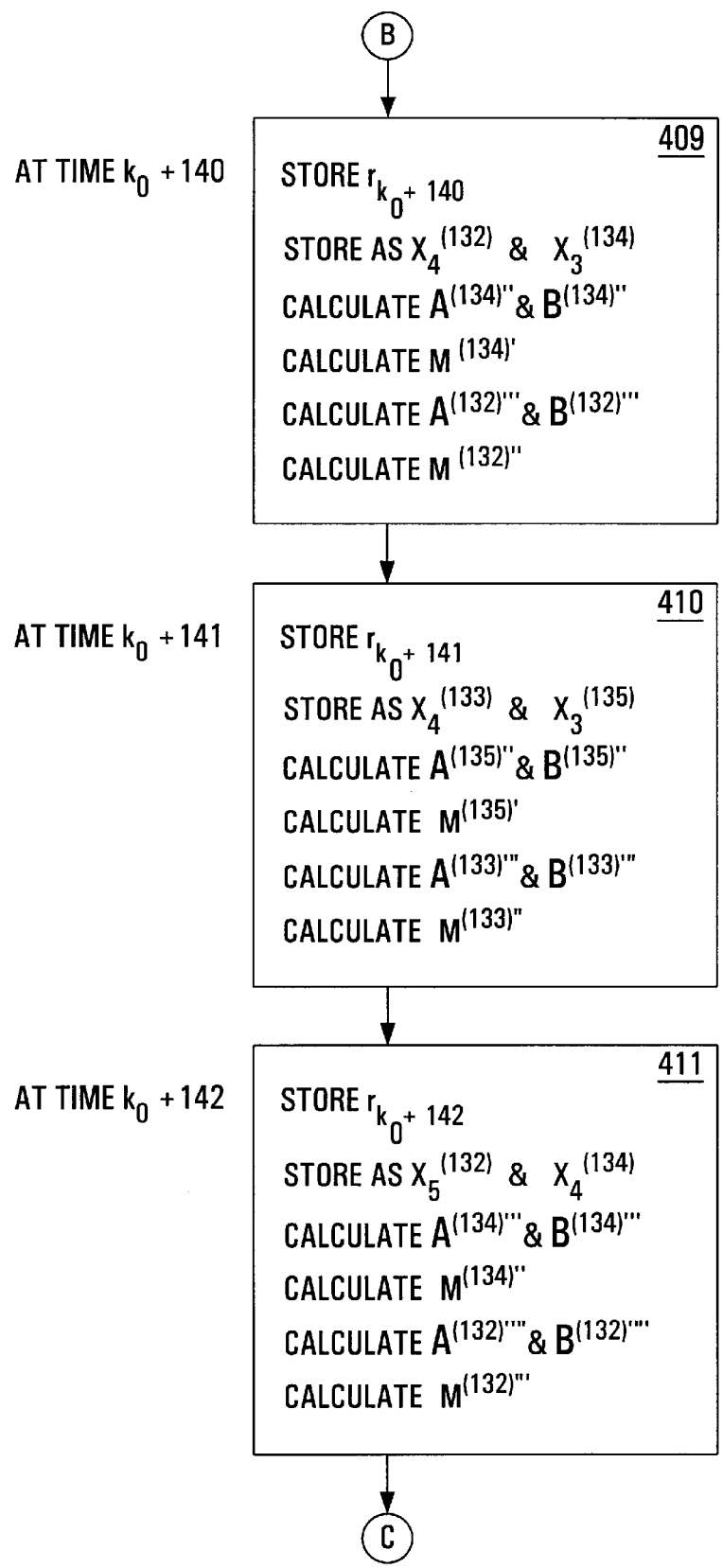
Figure 4D:
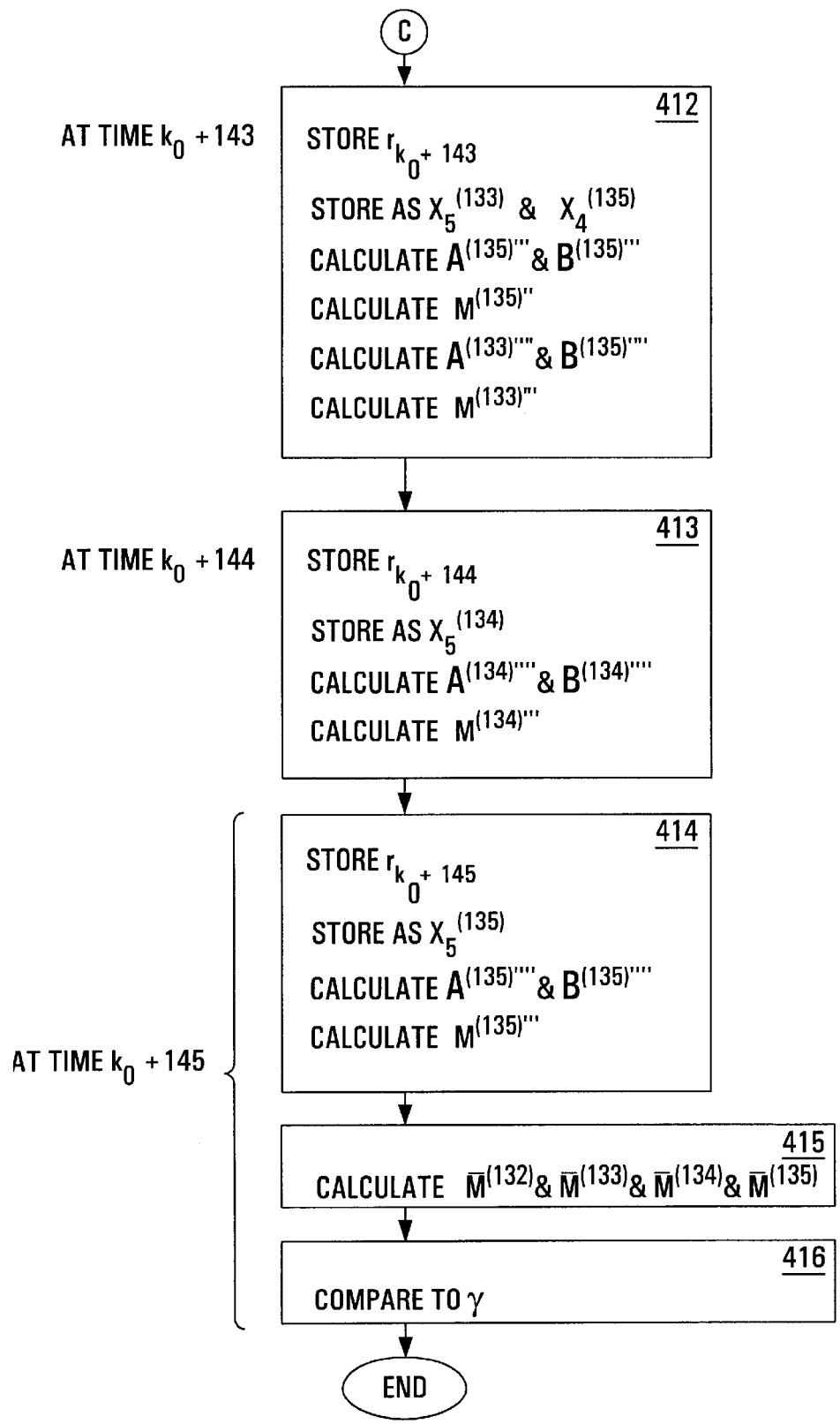

To achieve this task, therefore, the normal burst acquisition system 200 assumes two main functions, namely SYNC vector detection and subsequent CDVCC vector validation without necessarily performing CDVCC vector detection. FIG. 3 shows in more detail the algorithmic procedure of SYNC vector detection performed essentially by the combination of the correlator-integator 202, the power detector 204 and the comparator 206.

Step 301: At sample time k, the currently received complex-valued sample $r_k$ is stored in a memory, such as a shift register. It is also required that the twenty-six previously received complex-valued samples also be stored in memory. An ideal memory for this purpose is a circular buffer. At sample time k, thirteen alternate previously received and stored complex-valued samples $r_{k-2}$, $r_{k-4}$, . . . , $r_{k-26}$ are read from the circular buffer and are available for processing.

Step 302: The correlation factor R is calculated by correlating received samples $r_k$, $r_{k-2}$, . . . , $r_{k-26}$ with the known fourteen-element assigned SYNC vector s associated with the assigned slot. Preferably, R is calculated as R=

$$R = \left| \sum_{i=0}^{13} r_{k-2i} s^*_{13-i} \right|,$$

where the symbol "*" denotes the complex conjugate and |x| denotes the modulus of "x". It is noted that alternate samples are employed for the calculation of R. This is due to the fact that the sampling frequency of the sampler 201 is twice the transmitted symbol rate. Note that the estimation accuracy is improved to within $T_s/2$ seconds.

Step 303: The power estimate P serves as a normalizing factor and is derived from the complex-valued samples as P $$P = \left| \sum_{i=0}^{13} r_{k-2i} r^*_{k-2i} \right|.$$

Again, the symbol "*" denotes the complex conjugate and alternate samples are used in the calculation of the power estimate P.

Step 304: The correlation factor R is compared to a scaled version of the power estimate P to determine whether a sufficiently high correlation exists between the complex-valued samples $r_k$, $r_{k-2}$, . . . $r_{k-26}$ and the known SYNC vector s. If the correlation factor R is less than the power estimate P scaled by the scaling factor $\eta$, $0 \leq \eta \leq 1$, then the "NO" route is chosen and step 305 is entered. However, if the correlation factor R is greater than or equal to the scaled power estimate $\eta P$, then the "sync found" signal 257 (see FIG. 2) is set to indicate that the SYNC vector has been located. The scaling factor $\eta$ must be sufficiently low to increase the probability of correct detection and sufficiently high to decrease the probability of false alarm. A suitable neighbourhood for the scaling factor $\eta$ has been found to be around 0.75, although other thresholds may be found to be more suitable under different conditions.

Step 305: Since the SYNC vector s is deemed not to have been found, the algorithm advances to the next sample time k and starts over from step 301. It is to be appreciated that complex-valued samples stored in the circular buffer but unused until this point will now be used as steps 301 etc. are executed again.

Step 306: Since the SYNC vector s is deemed to have been found, the "sync found" signal 257 fed to the CDVCC validation block 207 is set to indicate the corresponding sample time k, which is fixed as the reference sample time $k_0$ as shown in FIG. 6. The algorithmic procedure of FIG. 3 then proceeds to skip 131 samples.

By skipping 131 samples, the next complex-valued sample, namely $r_{k_0+132}$ should be located at a position two samples (or one complete transmitted symbol period $T_s$) before the start of the CDVCC vector. In other words, under ideal channel conditions, $r_{k_0+132}$, is the first sample of a symbol 66 symbols after the SYNC vector and so should be two samples ahead of the start of the CDVCC vector as received by the base station. However, under conditions of dispersion, it is possible that the SYNC vector as detected in step 304 had been delayed and thus the complex-valued sample $r_{k_0+132}$, as received by the normal burst acquisition system, may already correspond to the first element of the CDVCC vector as received by the base station.

On the other hand, the first element of the CDVCC vector as received may be pushed as far back as sample $r_{k_0+135}$. In the present invention, the position of the first element of the received CDVCC vector is assumed to fall within a maximum time advance of 1 transmitted symbol period and a maximum time delay of ½ transmitted symbol period relative to its expected position, which is located 67 transmitted symbol periods after SYNC detection at sample time $k_0$. In general, however, it is within the scope of the present invention to account for a greater range of time delays (or advances) that may be suffered by the first element $c_0^A$ of the received CDVCC vector relative to its expected position.

According to the present invention, validation of the CDVCC is best achieved by performing multiple validation operations in parallel. In particular, given that there are four possible "shifts" contemplated for the received CDVCC vector $c^A$ (i.e., at time advances of ½ and 1 transmitted symbol period, at its natural position and at a time delay of ½ transmitted symbol period), four validation operations must be performed in parallel in order to determine whether any one of these "shifts" corresponds to the locally stored CDVCC vector $c^B$.

Figure 5:
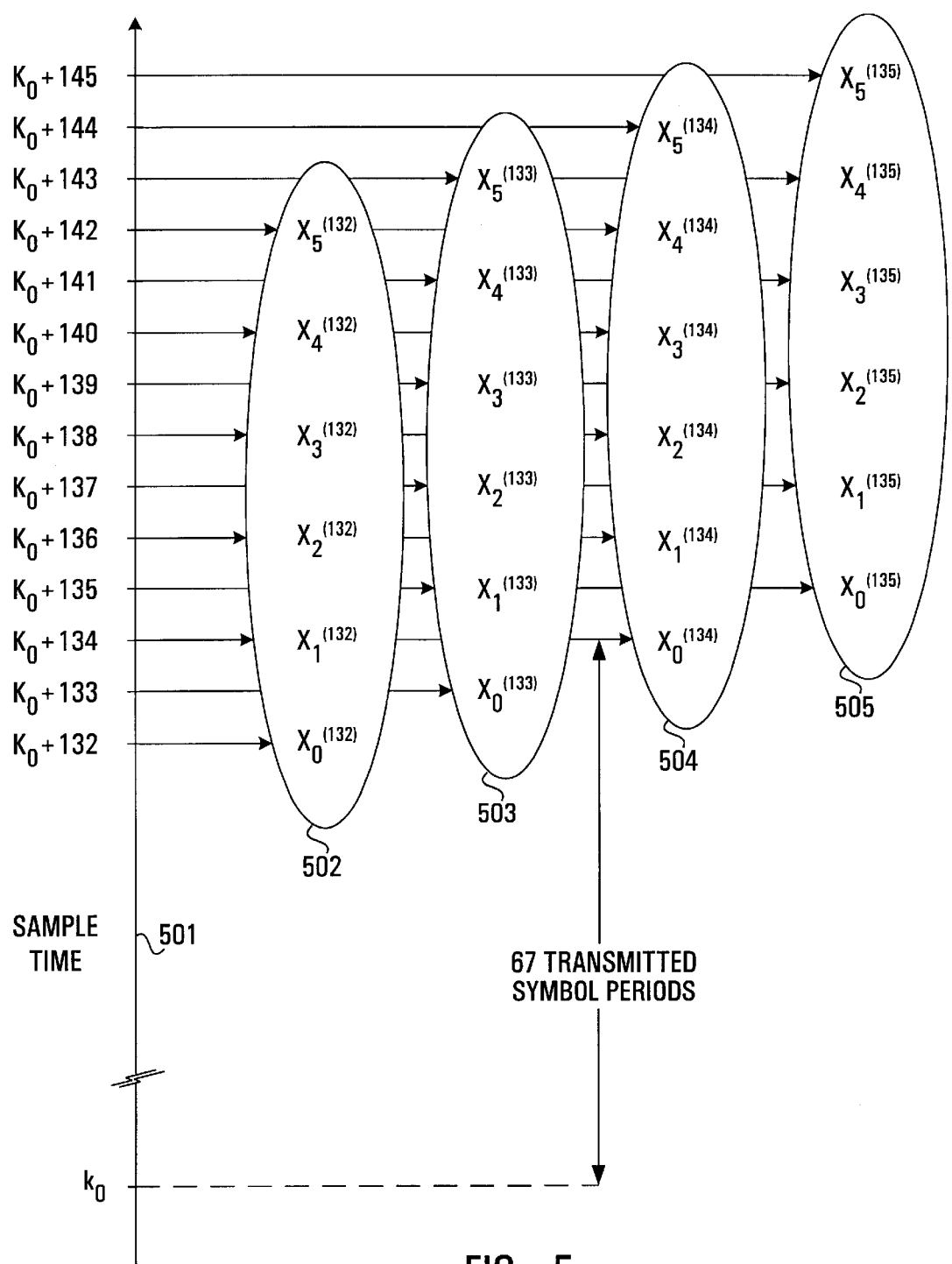
FIG. 5 shows a time axis and a set of possible CDVCC vector shifts placed on the time axis.

In order to better describe the inventive method applied, it is useful to introduce notation to represent the elements corresponding to each of the four possible CDVCC vector "shifts". To this end, FIG. 5 provides a vertical time axis 501 indicating the relative positions of sample time $k_0$ (at which SYNC vector detection has been flagged by the correlator-integrator 202 via the "sync found" signal 257), as well as sample times $k_0+132$ through $k_0+145$. Along the time axis 501 are positioned four possible CDVCC vector shifts 502–505, among which:

Vector shift 502 corresponds to the vector shift that is two samples before the "true" or "expected" position of the transmitted CDVCC vector $c^A$, i.e., 66 transmitted symbol periods after SYNC detection at sample time $k_0$.

Vector shift 503 corresponds to the vector shift that is one sample before the "true" or "expected" position of the transmitted CDVCC vector $c^A$, i.e., 66 ½ transmitted symbol periods after SYNC detection at sample time $k_0$.

Vector shift 504 corresponds to the vector shift that is aligned with the "true" or "expected" position of the transmitted CDVCC vector $c^A$, i.e., 67 transmitted symbol periods after SYNC detection at sample time $k_0$.

Vector shift 505 corresponds to the vector shift that is one sample after the "true" or "expected" position of the transmitted CDVCC vector $c^A$, i.e., 67 ½ transmitted symbol periods after SYNC detection at sample time $k_0$.

With continued reference to FIG. 5, each complex-valued sample between sample times $k_0+132$ and $k_0+145$ (inclusively) is denoted by at least one element $x_z^{(y)}$, wherein the superscript "y" denotes the sample time (relative to SYNC vector detection at time $k_0$) corresponding to the first element in one of the four possible CDVCC vector shifts. The subscript "z" denotes the element's position within the CDVCC vector. It is to be noted that according to this definition, one has $x_z^{(y+2)} = x_{z+1}^{(y)}$.

By way of example, it is seen that complex-valued sample $r_{k_0+135}$ is denoted both by $x_0^{(135)}$, i.e., the first element of the possible CDVCC vector shift starting at sample time $k_0+135$, and by $x_1^{(133)}$, i.e., the second symbol in the possible CDVCC vector shift starting at sample time $k_0+133$. It is also noted that if no time delay (or advancement) was introduced, then $c_i^A = x_i^{(135)}$, for $i=0, \ldots, 5$.

The remainder of the inventive method can be described with reference to FIG. 4, which outlines an algorithmic procedure to be followed by the CDVCC validation block 207 once 131 samples have been skipped in accordance with step 306 of FIG. 3. The goal of the procedure in FIG. 4 is to determine whether any of the possible CDVCC vector shifts 502–505 (describing possible positions for the received CDVCC vector $c^A$) come sufficiently "close" to the locally stored CDVCC vector $c^B$.

Step 401: At sample time $k_0+132$, the complex-valued sample $r_{k_0+132}$ is stored as $x_0^{(132)}$, i.e., the first element of the possible CDVCC vector shift starting at sample time $k_0+132$.

Step 402: At sample time $k_0+133$, the complex-valued sample $r_{k_0+133}$ is stored as $x_0^{(133)}$) i.e., the first element of the possible CDVCC vector shift starting at sample time $k_0+133$.

Step 403: At sample time $k_0+134$, the complex-valued sample $r_{k_0+134}$ is stored both as $x_1^{(132)}$ and as $x_0^{(134)}$.

Step 404: At sample time $k_0+135$, the complex-valued sample $r_{k_0+135}$ is stored both as $x_1^{(133)}$ and as $x_0^{(134)}$.

Step 405: At sample time $k_0+136$, the complex-valued sample $r_{k_0+136}$ is stored both as $x_2^{(132)}$ and as $x_1^{(134)}$. Now that three elements of the possible CDVCC vector shift starting at sample time $k_0+132$ are available, it is possible to set up and solve a set of equations. This set of equations will involve the received complex-valued samples $x_0^{(132)}$, $x_1^{(132)}$ and $x_2^{(132)}$; the first three elements $c_0^B$, $c_1^B$, $c_2^B$ of the locally stored CDVCC vector $c^B$ uniquely identifying the base station (and the corresponding cell); and a principal dispersion coefficient A and a multipath dispersion coefficient B.

Two dispersion coefficients are sufficient to adequately characterize the dispersion in most cases. Incidentally, it is critical to assume that channel variations are constant throughout the duration of the CDVCC vector, i.e., over the course of 6 transmitted symbol periods. The latter assumption has proven to be valid even at speeds of 100 km/h at a frequency of 1900 MHz. The set of equations referred to above can be formulated as:

$$x_2^{(132)} = A^{(132)'} c_2^B + B^{(132)'} c_1^B \qquad (1A)$$

$$x_1^{(132)} = A^{(132)'} c_1^B + B^{(132)'} c_0^B, \qquad (1B)$$

wherein the notation used to represent the dispersion coefficients A and B includes a superscript in parentheses denoting the starting sample time of the corresponding possible CDVCC vector shift, in this case $k_0+132$. Also, since the dispersion coefficients A and B shall be estimated several times, as described hereunder, the notation includes a number of primes denoting an estimate number. In this case, only one prime is shown, denoting the first in a series of estimates.

It is to be noted that if the first three elements $c_0^B$, $c_1^B$, $c_2^B$ of the locally stored CDVCC vector $c^B$ are identical, then equations (1A) and (1B) are under-determined and their solution should not be attempted at this point.

Step 406: At sample time $k_0+137$, the complex-valued sample $r_{k_0+137}$ is stored both as $x_2^{(133)}$ and as $x_1^{(135)}$. Another set of equations is solved for the first estimate of the dispersion coefficients corresponding to the possible CDVCC vector shift starting at sample time $k_0+135$:

$$x_2^{(133)} = A^{(133)\prime} c_2^B + B^{(133)\prime} c_1^B$$

$$x_1^{(133)} = A^{(133)\prime} c_1^B + B^{(133)\prime} c_0^B.$$

Step 407: At sample time $k_0+138$, the complex-valued sample $r_{k_0+138}$ is stored both as $x_3^{(132)}$ and as $x_2^{(134)}$. A set of equations is solved to obtain a first estimate of the dispersion coefficients corresponding to the possible CDVCC vector shift starting at sample time $k_0+134$:

$$x_2^{(134)} = A^{(134)\prime} c_2^B + B^{(134)\prime} c_1^B$$

$$x_1^{(134)} = A^{(134)\prime} c_1^B + B^{(134)\prime} c_0^B.$$

Additionally, a second estimate of the dispersion coefficients corresponding to the possible CDVCC vector shift starting at sample time $k_0+132$ is obtained from:

$$x_3^{(132)} = A^{(132)\prime\prime} c_3^B + B^{(132)\prime\prime} c_2^B$$

$$x_2^{(132)} = A^{(132)\prime\prime} c_2^B + B^{(132)\prime\prime} c_1^B.$$

At this point, there are two estimates for the dispersion coefficients corresponding to the possible CDVCC vector shift starting at sample time $k_0+132$. If the received CDVCC vector $c^A$ corresponds to the locally stored CDVCC vector $c^B$ and, if in addition, the first element of the received CDVCC vector $c^A$ starts at sample time $k_0+132$, then the dispersion coefficient estimates should not vary to a great degree, and it is desirable to calculate a metric which determines the accuracy of the estimates.

Accordingly, one may let $M^{(132)\prime}$ represent a metric associated with the first and second estimates of the dispersion coefficients corresponding to an assumed shift of the beginning of the CDVCC vector to sample time $k_0+132$. It is to be understood that any metric $M^{(132)\prime}$ may be used if it has a value which is a monotonic function of the difference between the calculated estimates of the dispersion coefficients. Preferably, the metric $M^{(132)\prime}$ is calculated as follows:

$$M^{(132)\prime} = |A^{(132)\prime} - A^{(132)\prime\prime}|^2 + |B^{(132)\prime} - B^{(132)\prime\prime}|^2.$$

Since the dispersion coefficients themselves actually remain constant, then a large variation in their estimation can only be due to the fact that the received CDVCC vector $c^A$, assumed to have its first element $c_0^A$ shifted to sample time $k_0+132$, does not match the locally stored CDVCC vector $c^B$.

As discussed previously, if the first three elements $c_0^B$, $c_1^B$, $c_2^B$ of the locally stored CDVCC vector $c^B$ are identical, then equations (1A) and (1B) above will be overdetermined. Instead of attempting to solve this problem, the metric $M^{(132)}$ is preferably calculated as: $M^{(132)\prime} = |x_2^{(132)} - x_1^{(132)}|^2$. A desirable property of this or any other appropriate modified metric is that it yields a small number when the first three elements of the CDVCC vector shift starting at sample time $k_0+132$ are identical.

Step 408: At sample time $k_0+139$, complex-valued sample $r_{k_0+139}$ is stored both as $x_3^{(133)}$ and as $x_2^{(135)}$. There are again two sets of equations to be solved, the first corresponding to the first estimate of the dispersion coefficients associated with the possible CDVCC vector shift starting at sample time $k_0+135$:

$$x_2^{(135)} = A^{(135)\prime} c_2^B + B^{(135)\prime} c_1^B$$

$$x_1^{(135)} = A^{(135)\prime} c_1^B + B^{(135)\prime} c_0^B.$$

At the same time, a second estimate of the dispersion coefficients corresponding to the possible CDVCC vector shift starting at sample time $k_0+134$:

$$x_3^{(134)} = A^{(134)\prime\prime} c_3^B + B^{(134)\prime\prime} c_2^B$$

$$x_2^{(134)} = A^{(134)\prime\prime} c_2^B + B^{(134)\prime\prime} c_1^B.$$

This leads to the calculation of a metric $M^{(133)\prime}$ associated with the first and second estimates of the dispersion coefficients corresponding to an assumed starting time for the CDVCC vector as being sample time $k_0+133$. Specifically, $M^{(133)\prime}$ is defined as:

$$M^{(133)\prime} = |A^{(133)\prime} - A^{(133)\prime\prime}|^2 + |B^{(133)\prime} - B^{(133)\prime\prime}|^2.$$

Again, if the first three elements $c_0^B$, $c_1^B$, $c_2^B$ of the locally stored CDVCC vector $c^B$ are identical, then a modified metric is to be calculated, preferably $M^{(133)\prime} = |x_2^{(133)} - x_1^{(133)}|^2$.

Step 409: At sample time $k_0+140$, complex-valued sample $r_{k_0+140}$ is stored both as $x_4^{(132)}$ and as $x_3^{(134)}$. There are again two sets of equations to be solved, the first corresponding to the second estimate of the dispersion coefficients associated with the possible CDVCC vector shift starting at sample time $k_0+134$:

$$x_3^{(134)} = A^{(134)\prime\prime} c_3^B + B^{(134)\prime\prime} c_2^B$$

$$x_2^{(134)} = A^{(134)\prime\prime} c_2^B + B^{(134)\prime\prime c1B}.$$

This permits the calculation of a metric $M^{(134)\prime}$ associated with the first and second estimates of the dispersion coefficients corresponding to an assumed starting time for the CDVCC vector as being sample time $k_0+134$:

$$M^{(134)\prime} = |A^{(134)\prime} - A^{(134)\prime\prime}|^2 + |B^{(134)\prime} - B^{(134)\prime\prime}|^2.$$

If the second, third and fourth elements $c_1^B$, $c_2^B$, $c_3^B$ of the locally stored CDVCC vector $c^B$ are identical, then the modified metric preferably becomes: $M^{(134)\prime} = |x^{2(134)} - x_1^{(134)}|^2$. Meanwhile, a third estimate of the dispersion coefficients corresponding to the possible CDVCC vector shift starting at sample time $k^0+132$ may be formed:

$$x_4^{(132)} = A^{(132)\prime\prime\prime} c_4^B + B^{(132)\prime\prime\prime} c_3^B$$

$$x_3^{(132)} = A^{(132)\prime\prime\prime} c_3^B + B^{(132)\prime\prime\prime} c^{2B}.$$

From this follows the calculation of a metric $M^{(132)\prime\prime}$ corresponding to the second and third estimates of the dispersion coefficients associated with an assumed starting time for the CDVCC vector as being sample time $k_0+132$. Specifically, $M^{(132)\prime}$ may be defined as:

$$M^{(132)\prime\prime} = |A^{(132)\prime} - A^{(132)\prime\prime\prime}|^2 + |B^{(132)\prime} - B^{(132)\prime\prime\prime}|^2.$$

Of course, if the third, fourth and fifth elements $c_2^B$, $c_3^B$, $c_4^B$ of the locally stored CDVCC vector $c^B$ are identical, then a different metric is calculated, preferably $M^{(132)\prime\prime} = |x_3^{(132)} - x_2^{(132)}|^2 = M^{(134)\prime}$.

Step 410: A procedure similar to the one described with reference to step 410 is followed, leading to the metrics $M^{(135)\prime}$ and $M^{(133)\prime\prime}$, each of which may be calculated in the above described manner. Of course, any function which has a value proportional to the difference between two successive sets of estimates for the dispersion coefficients may be used.

Step 411: A procedure similar to the one described with reference to step 410 is followed, leading to the metrics $M^{(134)\prime\prime}$ and $M^{(132)\prime\prime\prime}$.

Step 412: A procedure similar to the one described with reference to step 410 is followed, leading to the metrics $M^{(135)\prime\prime}$ and $M^{(133)\prime\prime\prime}$.

Step 413: At sample time $k_0+144$, complex-valued sample $r_{k_0+144}$ is stored as $x_5^{(134)}$, i.e., the last symbol in the possible CDVCC vector shift starting at sample time $k_0+134$. Since all six elements of the possible CDVCC vector shift starting at sample time $k_0+132$ have already been manipulated, the only metric left to be calculated is $M^{(134)'''}$. and this may be done in the aforementioned manner.

Step 414: At sample time $k_0+145$, complex-valued sample $r_{k_0+145}$ is stored as $x_5^{(135)}$, i.e., the last symbol in the possible CDVCC vector shift starting at sample time $k_0+135$. Again, since all six elements of the possible CDVCC vector shift starting at sample time $k_0+133$ have already been manipulated, the only metric left to be calculated at this stage is $M^{(135)'''}$.

Step 415: After all the metrics corresponding to the four possible CDVCC vector shifts have been calculated, it is propitious to define and compute the following "composite" metrics:

$$\overline{M}^{(132)} = M^{(132)'} + M^{(132)''} + M^{(132)'''}$$
$$\overline{M}^{(133)} = M^{(133)'} + M^{(133)''} + M^{(133)'''}$$
$$\overline{M}^{(134)} = M^{(134)'} + M^{(134)''} + M^{(134)'''}$$
$$\overline{M}^{(135)} = M^{(135)'} + M^{(135)''} + M^{(135)'''}$$

Of course, any composite metric which combines the previously calculated metrics and provides a measure of the total error between the locally stored CDVCC vector $c^B$ and one of four possible CDVCC vector shifts can be used. If the received CDVCC vector $c^A$ is in actuality the locally stored CDVCC vector $c^B$, and if multipath effects are not more severe than has been assumed, then the composite metric corresponding to one of the four possible CDVCC vector shifts should have a noticeably low value.

Step 416: Still at sample time $k_0+145$, the composite metrics $\overline{M}^{(j)}$ are each compared to a threshold level $\gamma$ and the value of $\gamma$ is selected such that, in most instances, it is exceeded by all except exactly one of the composite metrics $\overline{M}^{(j)}$ when $c^A$ is equal to $c^B$ and is exceeded by all of the composite metrics $\overline{M}^{(j)}$ when $c^A$ is not equal to $c^B$. The factor $\gamma$ should be therefore be small enough to reduce the probability of false detection, while being sufficiently large to reduce the probability of missing the CDVCC vector in the case of an actual match. Preferably, $\gamma$ lies in the neighbourhood of 0.75.

Upon detection of a match by the CDVCC validation block 207, the CDVCC vector in the normal burst under consideration is said to have been validated and outputs a message declaring this fact to other components of the base station. This message may also indicate the shift corresponding to the CDVCC vector shift which produced the match.

It is noted that in accordance with the present invention, the CDVCC received as part of a normal burst is validated but never actually detected by any given base station. This is reasonable since a given base station need only know whether the CDVCC vector transmitted by a mobile station and received by that base station is intended for that base station or not, thereby determining whether or not to interpret subsequent portions of data emanating from the mobile station.

It is also to be considered that under certain circumstances, e.g., when $\gamma$ is too high, several composite metrics may fall below $\gamma$ and the CDVCC will appear to be located in two or more positions simultaneously. This situation will tend to occur most often when multipath effects cause the elements of the CDVCC vector to be strongest between available sample times. In the case where more than one composite metric is inferior to $\gamma$, the average value of each dispersion coefficient (in this case, the average values of "A" and "B") used in the calculation of each composite metric is to be calculated. The accepted CDVCC vector shift is the one which yields a composite metric for which the average value of "A" is greater than the average value of "B", i.e., for which the principal dispersion coefficient is greater, on average, than the multipath dispersion coefficient.

While the preferred embodiment of the present invention has been described and illustrated, it will be apparent to one skilled in the art that numerous modifications and variations are possible. For instance, although the number of bits per symbol was limited to two for the purposes of the above discussion, it is within the scope of the present invention to use higher-order modulation schemes providing more bits per symbol. Even when the number of bits per symbol is restricted to two, other modulation formats can be employed, such as quadrature amplitude modulation (QAM), quaternary phase-shift keying (QPSK) and differential QPSK (DQPSK).

Moreover, while the usage of a fourteen-element SYNC vector and a six-element CDVCC vector may be specific to IS-54, it is to be understood that the present invention applies to any slot format in which a synchronization sequence (SYNC) and a verification sequence (CDVCC) are separated by a known amount of transmitted symbol periods.

Furthermore, it is to be understood that the invention is applicable to validation of any type of sequence, regardless of its length, of whether or not such a sequence expressly represents the CDVCC in a normal burst and whether or not is complex-valued. Furthermore, it is possible to employ a more sophisticated dispersion model to allow for greater flexibility in representing real-life environmental conditions. Of course, it is to be appreciated that the calculation of metrics and the like would continue to be performed in a manner similar to that disclosed herein.

For example, when dispersion spans L symbol periods, the corresponding dispersion model will use L dispersion coefficients, and, provided that there are greater than L+1 symbols in the CDVCC vector, there would be L equations to solve instead of equations (1A) and (1B). The problem is best formulated with the help of matrix algebraic notation:

$$\begin{bmatrix} x_{2L}^{(y)} \\ \cdots \\ x_{L+1}^{(y)} \\ x_L^{(y)} \end{bmatrix} = \begin{bmatrix} c_{2L-1}^B & \cdots & c_{L+1}^B & c_{L-1}^B \\ & \cdots & & \\ c_L^B & c_{L-1}^B & \cdots & c_1^B \\ c_{L-1}^B & c_{L-1}^B & \cdots & c_0^B \end{bmatrix} \begin{bmatrix} A_{L-1}^{(y)'} \\ \cdots \\ A_1^{(y)'} \\ A_0^{(y)'} \end{bmatrix},$$

where the $A_i$ denote the dispersion coefficients. It is observed that, in general, $2L+1$ samples must be received before one estimate of the L dispersion coefficients can be performed, assuming that there are two samples associated with each symbol.

Also, it need not be necessary to compute all four metrics corresponding to a particular possible CDVCC vector shift before constructing the associated composite metric. Since only a few elements of the CDVCC vector linked to the limited number of base stations within range will be identical, it may be sufficient only to examine the first two or three received elements prior to validation.

Of course, an additional degree of confidence can be obtained by performing the CDVCC validation over several subsequent slots assigned to that mobile station. Moreover, having successfully validated the CDVCC, the base station is capable of confirming the position of the reference sample $k_0$, which improves robustness of the SYNC detection procedure.

Finally, in order to provide additional protection against multipath fading, it is feasible to use multiple antennas. In this case, a separate validation procedure is performed for the sequence of samples derived from the signal received at each antenna. As soon as the CDVCC is validated using the signal from any one antenna, it can be said that the CDVCC has been properly validated.

In view of the many further conceivable variations of the present invention, its scope is only to be limited by the claims appended hereto.

We claimed:

1. A method of determining the presence of a verification sequence in a received sample stream arriving at respective sample times and having a received sample rate, said verification sequence consisting of a plurality of samples including a first sample, said received sample stream being obtained from a transmitted symbol stream having a transmitted symbol rate and having undergone dispersion, said dispersion being characterized by a plurality of dispersion coefficients, the method comprising the steps of:

determining a reference sample time;

for each one of a plurality of sample shifts indicating possible locations for the first sample of the verification sequence relative to the reference sample time: calculating at least two estimates for each of the plurality of dispersion coefficients; calculating the variation among the at least two estimates for each of the plurality of dispersion coefficients; and combining the calculated variations into a combined metric associated with the sample shift; and if the combined metric associated with at least one of the sample shifts is below a predetermined threshold, deciding that the verification sequence is present in the received sample stream.

2. A method according to claim 1, wherein the received sample rate is twice the transmitted symbol rate.

3. A method according to claim 1, wherein the received sample rate is identical to the transmitted symbol rate.

4. A method according to claim 1, wherein the verification sequence is the six-symbol coded digital verification color code (CDVCC) sequence in accordance with TIA/EIA standard IS-54.

5. A method according to claim 1, wherein a first one of the sample shifts indicates the location of the first sample of the verification sequence relative to the reference sample time under ideal channel conditions and wherein at least one other sample shift indicates the location of the first sample of the verification sequence relative to the reference sample time under multipath conditions.

6. A method according to claim 4, wherein a first one of the sample shifts indicates the location of the first sample of the verification sequence relative to the reference sample time under ideal channel conditions and wherein at least one other sample shift indicates the location of the first sample of the verification sequence relative to the reference sample time under multipath conditions.

7. A method according to claim 6, wherein the first one of the sample shifts is equal to sixty-seven times the inverse of the transmitted symbol rate.

8. A method according to claim 7, wherein one of the other sample shifts is equal to sixty-six times the inverse of the transmitted symbol rate.

9. A method according to claim 8, wherein another one of the other sample shifts is equal to sixty-six and one-half times the inverse of the transmitted symbol rate.

10. A method according to claim 9, wherein another one of the other sample shifts is equal to sixty-seven and one-half times the inverse of the transmitted symbol rate.

11. A method according to claim 1, wherein each sample in the received sample stream carries two bits of information and is modulated using quaternary phase-shift keying.

12. A method according to claim 1, wherein the step of determining the reference sample time comprises the steps of:

calculating a correlation factor between a synchronization sequence and a plurality of samples from the received sample stream comprising a current sample and selected past samples;

calculating a power estimate of the received sample stream;

comparing the correlation factor to the power estimate and setting the reference sample time to the current sample time if the correlation factor exceeds the power estimate by a predetermined ratio.

13. A method according to claim 12, wherein the received sample rate is identical to the transmitted symbol rate.

14. A method according to claim 12, wherein said selected samples are alternate past samples.

15. A method according to claim 14, wherein the received sample rate is twice the transmitted symbol rate.

16. A method according to claim 14, wherein the synchronization sequence is the fourteen-symbol SYNC sequence in accordance with TIA/EIA standard IS-54.

17. A method according to claim 1, wherein the dispersion coefficients are denoted $A_0, \ldots, A_{L-1}$ for a total number L of dispersion coefficients, wherein the $i^{th}$ sample making up the verification sequence is denoted $c_i$, wherein the number of samples in the verification sequence is greater or equal to 2L+1 and wherein, for a given sample shift, an estimate of the L dispersion coefficients is calculated by solving a system of equations of the form:

$$\begin{vmatrix} r_{2L} \\ \cdots \\ r_{L+1} \\ r_L \end{vmatrix} = \begin{vmatrix} c_{2L-1} & \cdots & c_{L+1} & c_{L-1} \\ & \cdots & & \\ c_L & c_{L-1} & \cdots & c_1 \\ c_{L-1} & c_{L-1} & \cdots & c_0 \end{vmatrix} \begin{vmatrix} A_{L-1} \\ \cdots \\ A_1 \\ A_0 \end{vmatrix}$$

for the dispersion coefficients $A_0, \ldots, A_{L-1}$ wherein the $r_k$ represent alternate samples in the received sample stream.

18. A method according to claim 1, wherein, for each sample shift, said variation is calculated as a function of the of the difference between consecutive pairs of estimates of each dispersion coefficient.

19. A method according to claim 1, wherein said combined metric is obtained by a function of the sum of the calculated variations.

20. A system for determining the presence of a verification sequence in a received sample stream arriving at respective sample times and having a received sample rate, comprising:

means for correlating a synchronization sequence with a current sample and selected past samples of the received sample stream, thereby to produce a correlation factor;

means for estimating the power contained in the received sample stream;

means for determining a reference sample time from the correlation factor and from the estimated power;

means for calculating, for each one of a plurality of sample shifts indicating possible locations for the first sample of the verification sequence relative to the reference sample time, at least two estimates for each of a plurality of dispersion coefficients;

means for calculating the variation among the at least two estimates for each of the plurality of dispersion coefficients;

means for combining the calculated variations into a combined metric associated with the sample shift;

wherein if the combined metric associated with at least one of the sample shifts is below a predetermined threshold, the system deciding that the verification sequence is present in the received sample stream.

21. A computer-readable storage medium containing software which, when running on a processor, follows a sequence of steps to determine the presence of a verification sequence in a received sample stream arriving at respective sample times and having a received sample rate, said verification sequence consisting of a plurality of samples including a first sample, said received sample stream being obtained from a transmitted symbol stream having a transmitted symbol rate and having undergone dispersion, said dispersion being characterized by a plurality of dispersion coefficients, the steps comprising:

determining a reference sample time;

for each one of a plurality of sample shifts indicating possible locations for the first sample of the verification sequence relative to the reference sample: calculating at least two estimates for each of the plurality of dispersion coefficients; calculating the variation among the at least two estimates for each of the plurality of dispersion coefficients; and combining the calculated variations into a combined metric associated with the sample shift; and if the combined metric associated with at least one of the sample shifts is below a predetermined threshold, deciding that the verification sequence is present in the received sample stream.

* * * * *